United States Patent
Morton et al.

(10) Patent No.: US 11,391,409 B2
(45) Date of Patent: Jul. 19, 2022

(54) WEAR INDICATOR FOR USE WITH PIPELINE PIG COMPONENTS HAVING A PIPE WALL CONTACTING SURFACE

(71) Applicant: TDW Delaware, Inc., Wilmington, DE (US)

(72) Inventors: Joseph Alan Morton, Tulsa, OK (US); Robert Fulton Hendricks, Tulsa, OK (US); Roger L. Poe, Beggs, OK (US)

(73) Assignee: TDW Delaware, Inc., Wilmington, DE (US)

( * ) Notice: Subject to any disclaimer, the term of this patent is extended or adjusted under 35 U.S.C. 154(b) by 90 days.

(21) Appl. No.: 16/928,167

(22) Filed: Jul. 14, 2020

(65) Prior Publication Data

US 2021/0018134 A1    Jan. 21, 2021

Related U.S. Application Data

(60) Provisional application No. 62/874,753, filed on Jul. 16, 2019.

(51) Int. Cl.
*F16L 55/42* (2006.01)
*F16L 101/30* (2006.01)

(52) U.S. Cl.
CPC .......... *F16L 55/42* (2013.01); *F16L 2101/30* (2013.01)

(58) Field of Classification Search
CPC .............................. F16L 55/42; F16L 2101/30
USPC ........................................................... 138/90
See application file for complete search history.

(56) References Cited

U.S. PATENT DOCUMENTS

| | | | | |
|---|---|---|---|---|
| 3,766,587 A | * | 10/1973 | French | G01M 3/005 15/104.061 |
| 4,465,104 A | * | 8/1984 | Wittman | F16L 55/1283 138/89 |
| 4,984,322 A | * | 1/1991 | Cho | B08B 9/0557 15/104.061 |
| 5,127,125 A | * | 7/1992 | Skibowski | B08B 9/0554 15/104.061 |
| 5,295,279 A | * | 3/1994 | Cooper | B08B 9/0557 15/104.061 |

(Continued)

FOREIGN PATENT DOCUMENTS

DE            2136701 A1    2/1973
KR         101784636 B1   10/2017

*Primary Examiner* — Craig M Schneider
*Assistant Examiner* — David R Deal
(74) *Attorney, Agent, or Firm* — GableGotwals (57) ABSTRACT

A pigging device of this disclosure includes a wear indicator configured to visually indicate an amount of material loss of a pipe wall contacting surface. The material loss may be symmetrical or asymmetrical. The pipe wall contacting surface may be any shape suitable, including but not limited to spherical-shaped, cylindrical-shaped, cup-shaped, disc-shaped, conical-shaped, frusto-conical shaped, bowl-shaped, and bullet-shaped. In some embodiments, the pigging device is a pipeline pig such as but not limited to a spherical foam pig, cylindrical-shaped foam pig, or a bullet-shaped foam pig. In other embodiments, the pigging device is a component of a pipeline pig such as but not limited to a cup or disc arranged about a body of the pipeline pig. The pigging device may also be a pigging disc element. The pigging device may be made of any suitable material, including but not limited to an elastomer such as urethane.

16 Claims, 6 Drawing Sheets

(56) References Cited

U.S. PATENT DOCUMENTS

| | | | |
|---|---|---|---|
| 6,067,682 A | 5/2000 | Rankin | |
| 8,239,994 B2* | 8/2012 | Dyck | B08B 9/0557 |
| | | | 15/104.061 |
| 2018/0207693 A1* | 7/2018 | Long | B08B 9/0551 |
| 2018/0209574 A1* | 7/2018 | Long | B08B 9/0557 |

* cited by examiner

WEAR INDICATOR FOR USE WITH PIPELINE PIG COMPONENTS HAVING A PIPE WALL CONTACTING SURFACE

CROSS REFERENCE TO APPLICATIONS

This application claims priority to U.S. Provisional Application 62/874,753 filed Jul. 16, 2019.

FIELD OF THE DISCLOSURE

The disclosure relates generally to pipeline pigs. More particularly, the invention relates to wear indicators for pipeline pigs and pigging components having a pipe wall contacting surface that is subject to wear during pigging, such as but not limited to urethane components

BACKGROUND OF THE DISCLOSURE

A device that is transmitted through a pipeline is typically referred to as a pipeline pig. A pipeline pig may be used to clean the interior surface of the pipeline. Another use for a pipeline pig is for separating one fluid medium from another. Sometimes pipeline pigs are used for pushing out entrapped liquids in a gas transmitting pipeline. Pipeline pigs may be sent through a pipeline to gain information about the condition of the pipeline. Such pigs are frequently referred to as "instrumentation pigs" and these type of devices can be used to provide information as to the ovality of the pipeline, the interior diameter of various sections of the pipeline, the occurrence of dents, buckles or bulges in the pipeline wall, the detections of bends or changes in direction of the pipeline and the occurrence of corrosion in the pipeline interior or exterior walls.

Pipeline pigs include components that are in contact with the pipe wall and, therefore, subject to wear during use. By way of a non-liming example, pipeline pigs, particularly of the instrumentation type, normally employ elements such as cups or disks formed of a resilient material like urethane. The cups or disks serve two functions: (1) they support the body of the pig within the interior of the pipeline and (2) at least one element for each pig provides a piston-like action so that the flow of the fluid medium, whether liquid or gas, through the pipeline serves to propel the pig forward under differential pressure. The cups and disks have a limited service life and must be replaced when they become worn. However, monitoring wear relies upon guidelines of how to measure and determine the amount of wear as percent urethane remaining. In a number of cases, no monitoring is done. Instead, a "successful" run is considered an indication the cups and disks are functioning properly.

By way of example, some operators continue to use pigging devices long past the point where the pig is effective for its intended purpose such as cleaning. Cleaning pigs can quickly reach a point at which the pigging device no longer contacts or integrates with the pipeline wall and the pig is simply moving through the pipeline without pressure pushing it forward. The pig is basically along for the ride with the velocity of the stream within which it is immersed. The pig ending its ride in a pig receiver does not mean the pig performed its intended function when in the pipeline. Therefore, a need exists to quickly and easily determine the amount of wear experienced by pipe contracting surfaces and whether the amount of wear falls within a predetermined effective operating range.

SUMMARY

Embodiments of a pigging device of this disclosure include at least one pipe wall contacting surface and a wear indicator (gauge) arranged or configured to visually indicate an amount of material loss of the pipe wall contacting surface between a first size and a predetermined minimum effective size. The first size may be a predetermined maximum size indicative of when the pigging device is new or unused. The pipe wall contacting surface may be any shape suitable, including but not limited to spherical-shaped, cylindrical-shaped, cup-shaped, disc-shaped, conical-shaped, frusto-conical shaped, bowl-shaped, and bullet-shaped. In some embodiments, the pigging device is a pipeline pig such as but not limited to a spherical foam pig, a cylindrical-shaped foam pig, or a bullet-shaped foam pig. In other embodiments, the pigging device is a component of a pipeline pig such as but not limited to a cup or disc arranged about a body of the pipeline pig. The pigging device may also be a pigging disc element. The pigging device may be made of any suitable material, including but not limited to an elastomer such as urethane.

The wear indicator may be located on the pipe wall contacting surface or spaced from the contacting surface. The wear indicator may include one or more of the following: a raised surface such as but not limited to a ring or a bead; multiple raised or stepped surfaces; an insert having ends with different areas located toward and away from the pipe wall contacting surface; one or more similar-sized or different-sized cavities, holes, slots, or grooves; or a color or a material the same as or different than that of the pipe wall contacting surface. Examples of indicators include but are not limited to raised or grooved surfaces, inserted geometrics that will change dimensionally as a function of wear, drilling of holes into the device that will disappear or appear as the pipe wall contacting surface wears, grooved surfaces, and the use of layered colors of material.

Regardless of function, shape, or material of the pigging device, or the type of wear indicator used or its location relative to the pipe wall contacting surface, the pipe wall contacting surface has a first size "S1" at time "t1", a second smaller size "S2" at time "t2", and a predetermined effective minimum size "S3," where t2>t1 and S1>S2≥S3. The wear indicator is functional between S1 and S3, with at least a portion of the wear indicator visible between S1 and S3. In embodiments, the first size S1 can be a predetermined maximum size indicative of when the pigging device is new or unused. The wear indicator is visible at S1 to provide a visual control that helps to ensure that a replacement pigging device is new and not previously used. In some embodiments, a size S4 may be indicated, where S3>S4. The size S3 may also be the size at time "t3", t3>t2, with S4 being the predetermined effective minimum size. There may be intermediate wear indicators and sizes between S1 and S3 (or S4).

Embodiments of a method of this disclosure for indicating wear of a pipe wall contacting surface of a pigging device may include inserting the pigging device into one end of a pipeline; retrieving the pigging device at another end of the pipeline; and inspecting the wear indicator. No measurement device or physical measurement of the pigging device is required. Rather, the wear indicator immediately gives a user the information needed through visual inspection. at a glance and without a measurement device. The pigging device may be a pipeline pig or may be a component of the pig that is in contact with the pipe wall.

BRIEF DESCRIPTION OF THE DRAWINGS

By way of a non-limiting example, the pigging device is a urethane cup. The wear indicator includes a raised portion or bead of the cup spaced at a fixed distance from the top or leading edge of the cup. As the cup wears down to the point the surface of the cup and the surface of the bead are synonymous the cup can immediately be identified as worn out. covered all of the points to describe the wear indicators for these urethane items.

FIG. 3A is a perspective view of another embodiment of a pigging device of this disclosure. By way of a non-limiting example, the pigging device is a urethane spherical pig. The wear indicator includes an insert. The insert may have a first end having a first area and a second end having a second different area greater than that of the first area, with the first end being located at or nearer the pipe wall contacting surface than the second end. As the pipe wall contacting surface of the pig wears, the different sized area of the insert is exposed.

Although the drawing figures of this disclosure illustrate the visual indication of the wear indicator as being symmetric, persons of ordinary skill would recognize that wear may be asymmetrical, with the wear indicator reflecting that. Wear tends to be asymmetrical in pigging devices which have a biased orientation when used. By way of a non-limiting example T. D. Williamson's V-JET® corrosion inhibitor pig may have a biased orientation and wear of its pipe contacting surfaces can be asymmetrical.

Elements and Numbering Used in the Drawings and Description pigging device 10; cup 11; front end 12; rear end 14; forward flange portion 16; rearward annular face 18; central orifice 20; attachment orifice 22; frusto-conical section 24; exterior frusto-conical surface 26; interior frusto-conical surface 28; wear indicator 30; raised surface 31; top or leading edge 32; pipe wall contacting surface 34; outer circumference 36; inner circumference 38; insert 44; smaller end 46; larger end 48; cavity 50; open end 52; closed end 54; uppermost end 56; lowermost end 58; annular slot or groove 62; uppermost end 64

DETAILED DESCRIPTION

In embodiments of this disclosure, a wear indicator is provided to assist in determining when a pigging device having a pipe wall contacting surface should be replaced. Embodiments of a wear indicator of this disclosure may be one of several different geometries as well as several different placements or configurations on the pigging device. For example, the wear indicator may be external and placed anywhere suitable on the pipe wall contacting surface of the pigging device, internal at a predetermined depth or distance below or from the pipe wall contacting surface, an integral part that functions independently to show the level of wear, or some combination of the above. The wear indicator may be positioned such that it never contacts the pipe wall. In other embodiments, it may contact the pipe wall when the pipe wall contacting surface reaches a predetermined smaller size.

The pigging device includes a pipe wall contacting surface having a first size "S1" at time "t1", a second smaller size "S2" at time "t2", and a predetermined minimum effective size "S3", where t2>t1 and S1>S2≥S3. The size S1 may be the new, unused (maximum) size of the pigging device. The size S2 may be a lower acceptable limit for re-use of the pigging device, that is, the pipe wall contacting surface of the pigging device is unlikely to wear past S3 during the run if the wear indicator is at S2 at the start of the run. The size S2 or S3 may be the size at which replacement of the pigging device is required. The pipe wall contacting surface may be a portion of the overall pipe wall facing surface of the pigging device.

In some embodiments, a size S4 may be indicated, where S3>S4. The size S3 may be the size at time "t3", t3>t2, with S4 being the predetermined effective minimum size. Size S3 may also be the lower acceptable limit for re-use of the pigging device in a next subsequent run. Additionally, there may be intermediate wear indicators and sizes between S1 and S3 (or S4). The size S4 may also be used to indicate wear beyond the predetermined minimum effective size.

The pipe wall contacting surface may be any portion of the pigging device that comes into contact with the pipe wall when the pigging device is in use. For example, the pipe wall contacting surface may be a top or leading edge of the pigging device or a surface area of the pigging device. The pipe wall contacting surface may be any shape suitable, including but not limited to spherical-shaped, cylindrical-shaped, cup-shaped, disc-shaped, conical-shaped, frusto-conical shaped, bowl-shaped, and bullet-shaped. The wear indicator is functional between S1 and S3 (or S4), with at least a portion of the wear indicator visible at S1 and between S1 and S3 (or S4).

In some embodiments, the pigging device is a pipeline pig such as but not limited to a spherical foam pig, cylindrical-shaped foam pig, or a bullet-shaped foam pig. The pipe wall contacting surface, therefore, is an outer wall surface of the pig. In other embodiments, the pigging device is a component of a pipeline pig such as but not limited to a cup or disc arranged about a body of the pipeline pig. The pipe wall contacting surface in these embodiments lies between a forward and rearward surface of the pigging device. The pigging device may also be a pigging disc element. The pigging device may be made of any suitable material, including but not limited to an elastomer such as urethane.

Regardless of function, shape, or material of the pigging device, or regardless of the wear indicator used or its location, the wear indicator provides a visual indication as to wear as well as replacement of the device.

The wear indicator may include one or more of the following: a raised surface such as but not limited to a ring or a bead; multiple raised or stepped surfaces; an insert having ends with different areas located toward and away from the pipe wall contacting surface; one or more similar-sized or different-sized grooves, cavities, holes, or slots; or a color or a material the same as or different than that of the pipe wall contacting surface In some embodiments, the wear indicator may include a raised surface. For example, in embodiments where the pigging device is a cup or disc, the wear indicator includes a raised annular ring or bead of the cup spaced at a fixed distance from the top or leading edge of the cup. The fixed distance is commensurate with an acceptable amount of wear of the pipe wall contacting surface. As the pipe wall contacting surface of the cup or disc wears down, the pipe wall contacting surface will eventually match an uppermost end of the raised surface, to indicate the cup or disc is degraded such that use of the cup is no longer as effective as it should be. As the cup wears down to the point the surface of the cup and the surface of the bead are synonymous the cup can immediately be identified as worn out. No physical measurement or measuring device is required to determine the amount of wear. A wear mark, either raised or recessed at a calculated location, provides the user with a built-in mark to visually determine when the wear has reached a predetermined percentage. If the pigging device is worn to this location, it is time to provide maintenance, replacement, or further evaluation.

Figure 1:
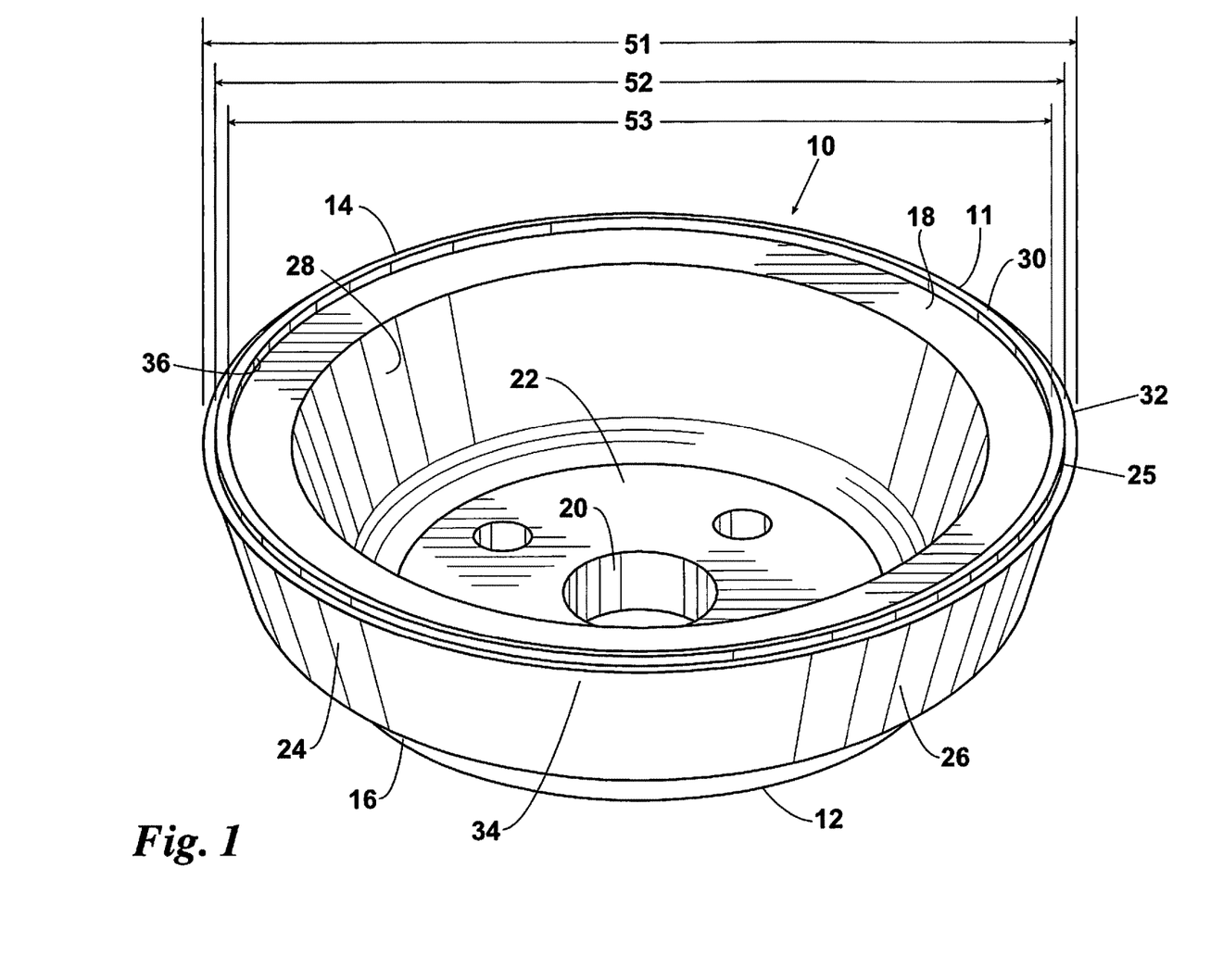
FIG. 1 is a perspective view of an embodiment of a pigging device including a wear indicator of this disclosure.
Figure 2A:
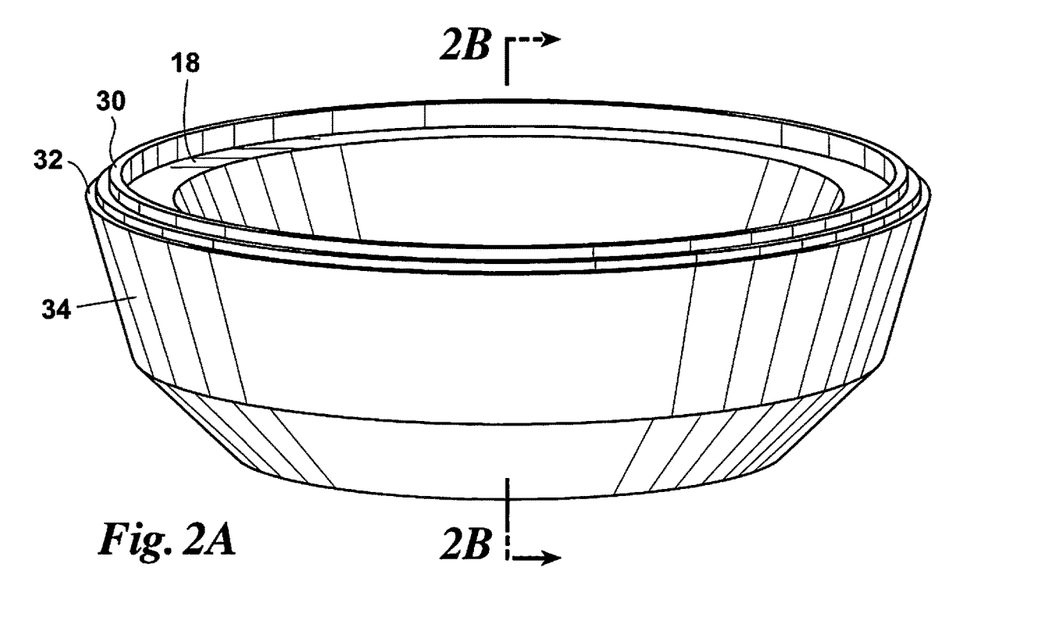
FIG. 2A is an isometric view of another embodiment of a wear indicator of this disclosure. The wear indicator includes a multiple step raised surface or bead.
Figure 2B:
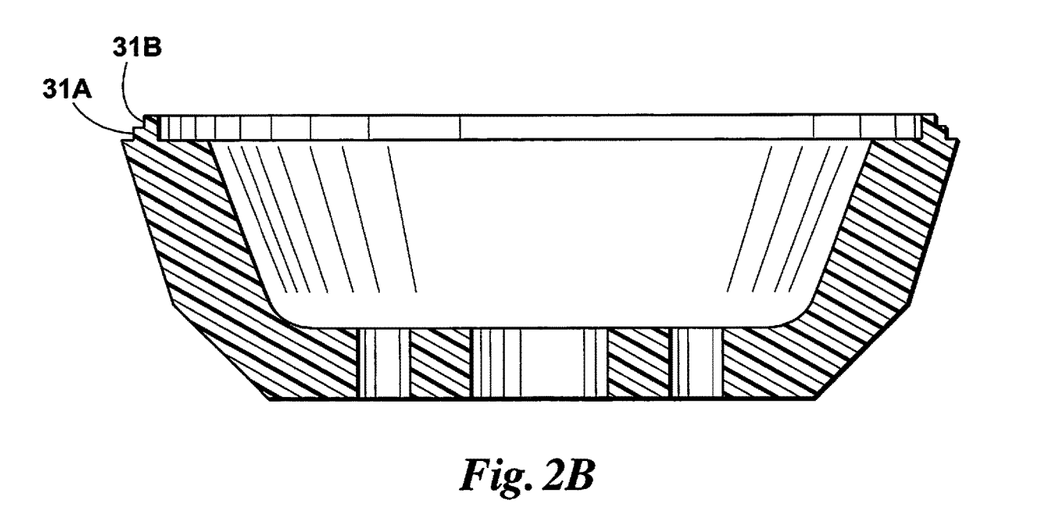
FIG. 2B is an isometric cross-section view of the wear indicator of FIG. 2A.
Figure 3A:
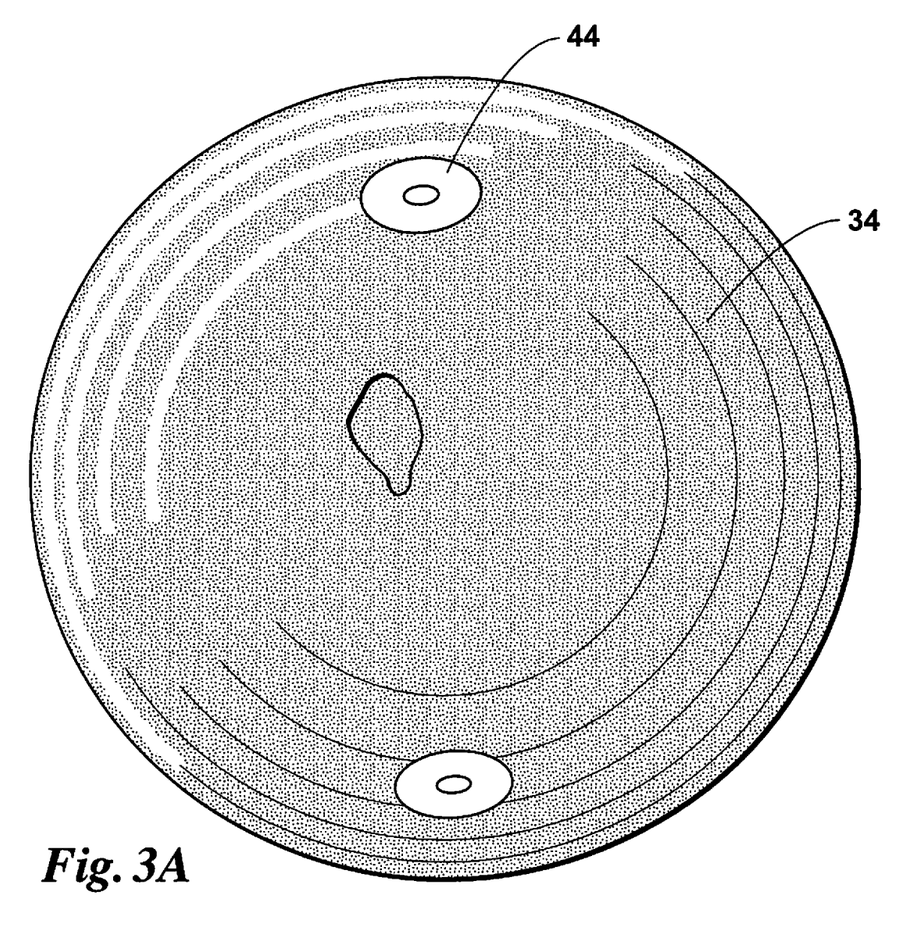
Figure 3B:
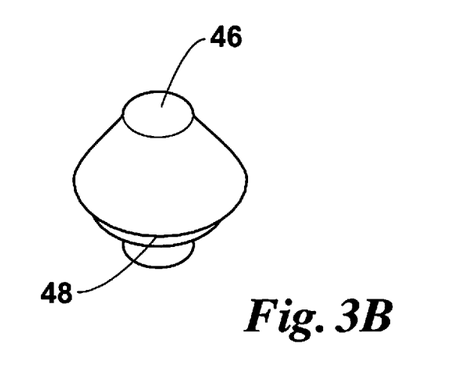
FIG. 3B is a perspective view of the wear indicator of FIG. 3A.
Figure 4A:
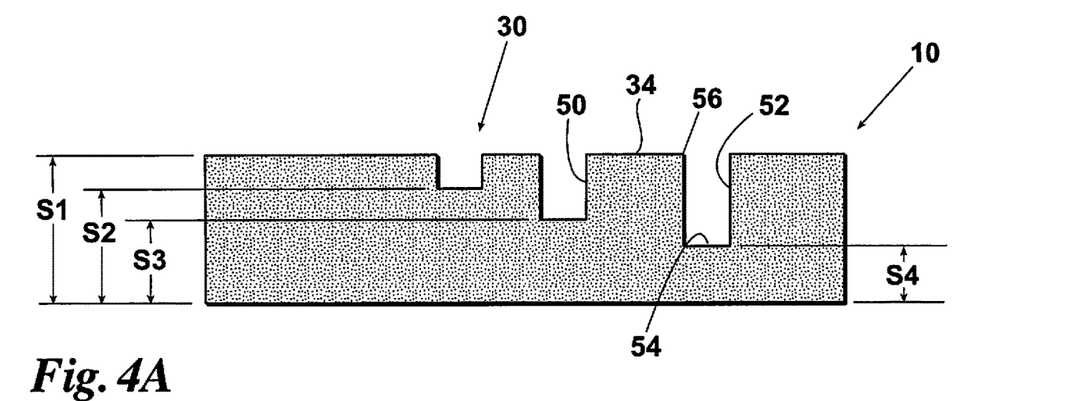
FIG. 4A is a cross-sectional schematic plan view of another embodiment of a wear indicator of this disclosure. Holes, slots, or grooves are provided in a pipe wall contacting surface of the pigging device for indicating loss of material.
Figure 4B:
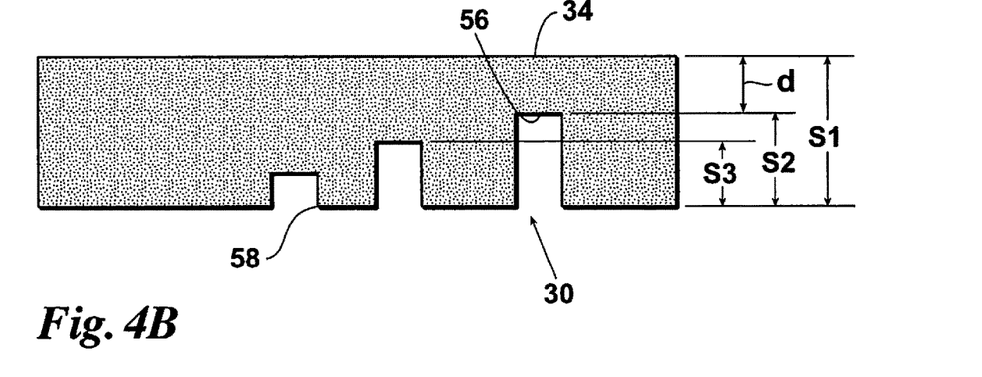
FIG. 4B is another cross-sectional schematic plan view of an embodiment in which the holes, slots, or grooves are from the underside to the pigging device, being exposed when the device is worn past a certain amount.
Figure 5:
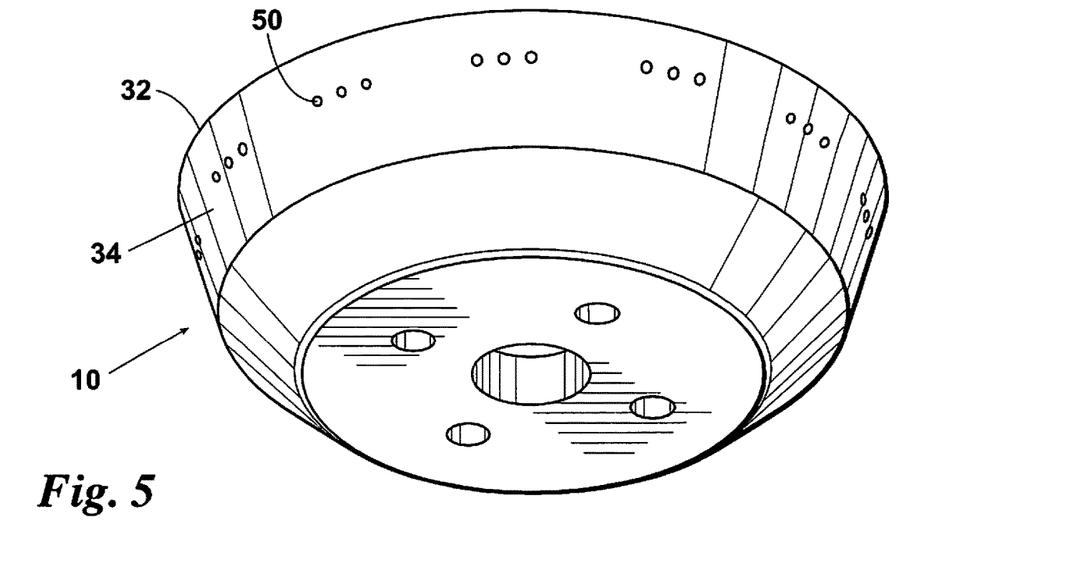
FIG. 5 is an isometric view of another embodiment of a wear indicator of this disclosure. The wear indicator includes a plurality of holes. Each set of holes may include holes of different depths. In some embodiments, the holes may be randomly spaced on the pipe wall contacting surface.
Figure 6A:
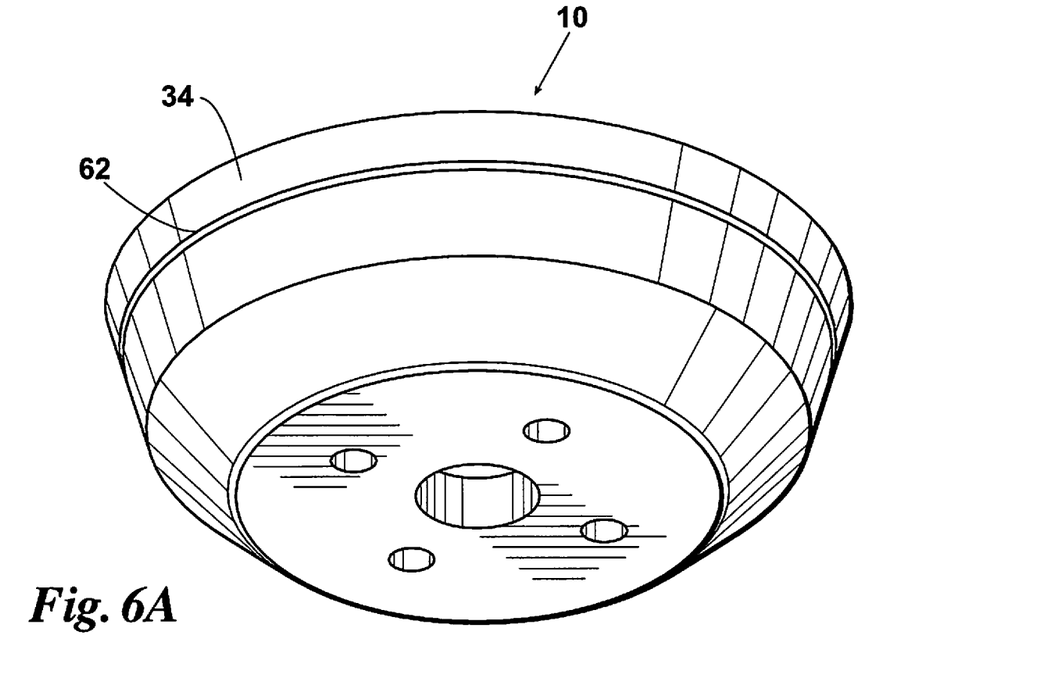
FIG. 6A is an isometric view of another embodiment of a wear indicator of this disclosure. The wear indicator includes an annular slot or groove located on a portion of the pipe wall contacting surface.
Figure 6B:
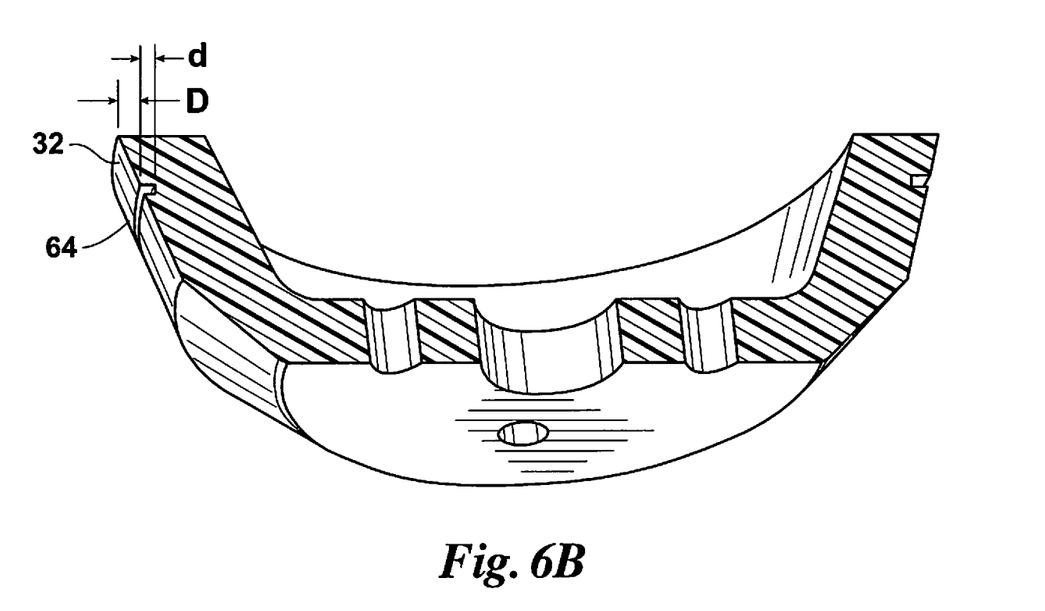
FIG. 6B is an isometric cross-section view of the wear indicator of FIG. 6A.
Figure 7:
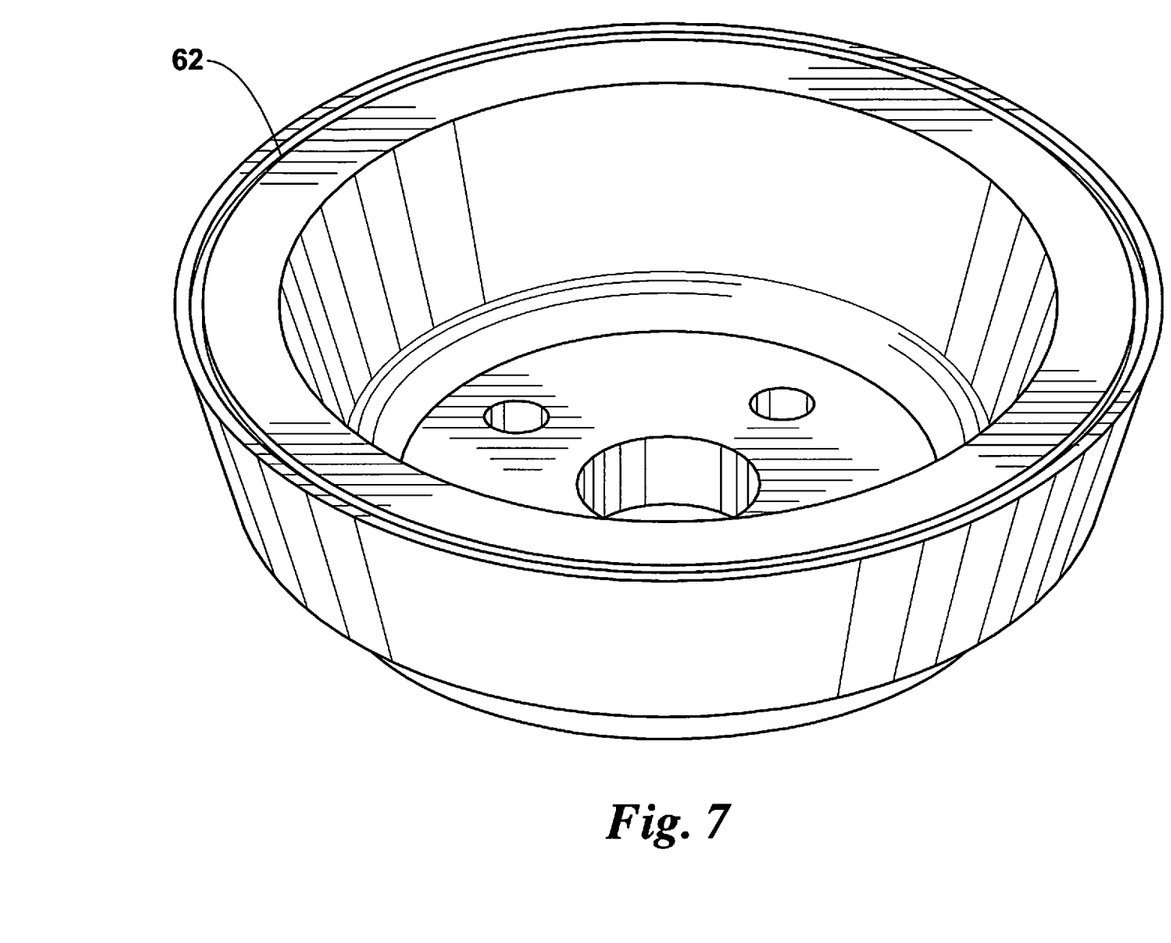
FIG. 7 is an isometric view of another embodiment of a wear indicator of this disclosure. The wear indicator includes an annular slot or grove on a rearward annular surface of the pigging device.

By way of a non-limiting example and referring now to FIGS. 1-2B, a pigging device 10 in the form of a cup 11 for use on a pipeline pig is shown includes a pipe wall contacting surface 34. Cup 11 has front end 12 and rear end 14. Forward flange portion 16 is located at front end 12. Rearward annular face 18 is located on rear end 14. Forward flange portion 16 defines central orifice 20 and plurality of attachment orifices 22. Frusto-conical section 24 is between forward plate portion 16 and rearward annular face 18. Frusto-conical section 24 has exterior frusto-conical surface 26 and interior frusto-conical surface 28. Wear indicator 30 and in the form of an annular ring or bead 31 is located on rearward annular face 18. The annular ring or bead can be squared off such that 90-degree bends are involved and may be rectangular in shape. In some embodiments, the ring or bead is located at a distance "D" such as 0.0625" (1.5875 mm) from the top or leading edge 32 of the cup. The distance D may be equal to size S1 less S2. In other embodiments, the outer circumference 36 of the indicator 30 is at S1, the inner circumference 38 is at S3. The indicator 30 may include multiple raised or stepped rings or beads 31A, 31B.

In other embodiments, the wear indicator may include an insert. Inserts may be any shape suitable. In one embodiment, a first end of an insert having a relatively smaller cross-section is located above, at, or near a surface of a pipe wall contacting surface. A relatively larger cross-section of the insert is located at a second end at a distance beneath the surface. When a component experiences wear, the geometry of the indicator results in a greater amount of the indicator to be visible. In other words, the indicator appears to "grow" to indicate more wear. Measurements, such as, but not limited to, a maximum diameter of the exposed indicator may be utilized to indicate when wear is excessive. The first (proximal) end can be an exposed end, for example, when the pipe wall contacting surface is in size S1. The second (distal) end of the insert may be exposed when the pipe wall contacting surface is between S2 and S3 or at S2.

By way of another non-limiting example and referring now to FIGS. 2A & 2B, pigging device 10 is a spherical-shaped pig including a wear indicator 30. The wear indicator 30 may be an insert 44 such as, but not limited to, a conical-shaped insert. Insert 44 may have a geometry defining a small end 46 and large end 48, the large end 48 located at or in proximity to the pipe wall contacting surface 34. The insert 44 may also be located a fixed distance below the pipe wall contacting surface. In other embodiments, the insert 44 creates a cavity driven by the insert. For example, insert 44 may be an annular ring that creates the cavity as the pipe wall contacting surface 34 wears.

In yet other embodiments, the wear indicator may include a cavity including an opening at one end and a closed bottom end at another end. The cavity may also be located at a fixed distance below the pipe wall contacting surface, the cavity or open end becoming exposed when the pigging device is beyond its effective usefulness. The opening may lie on the pipe wall contacting surface or it might lie on a rearward surface spaced a fixed distance from a top or leading edge of the pipe contracting surface. The cavity may be any shape preferable, including but not limited to slot-shaped and circular-shaped. Multiple cavities may be spaced at predetermined spacings or random spacings about the pipe wall contacting surface. The cavities may have the same or different depths, the different depths indicating different amounts of wear.

Referring now to FIGS. 4A-7, the pigging device 10 may include a cavity 50 having an open end 52, a closed end 54, and depth "D". The open end 52 may be an uppermost end 56 of the cavity 50, located at or toward the pipe wall contacting surface 34. The depth D of the cavity 50 is diminished as the pipe wall contacting surface 34 wears. In some embodiments, the open end 52 may be a lowermost end 58 of the cavity 50, the closed end 54 being located at or toward the pipe wall contacting surface 34. The closed end 54 may be a fixed distance "D" pipe wall contacting surface 34. The distance D may be equal to size S1 less S2. The closed end 54 may be located at size S2 or S3. The cavity 50 may be in the form of a hole or slot. See e.g. FIG. 5. In other embodiments, the cavity 50 may include one or more annular slot or grooves 62. See e.g. FIGS. 4A & 4B. An uppermost end 64 of the groove 62 may be located at a distance D from the top or leading edge 32 of the pigging device 10. The groove 62 may be of uniform or varying depth.

In other embodiments, the pigging device may include a wear indicator having a same or a different material than that of the pigging device or the pipe wall contacting surface. For example, the wear indicator can be metallic, nylon, rubber or any material that would be applicable to a pigging application. In some embodiments, the wear indicator may be an insert made of a harder material than the pigging device substrate and not only indicate wear but may also impede wear of the softer material substrate. By way of a non-limiting example, these inserts could a metal such as brass or bronze, or even steel to slow wear, with the pigging device substrate being urethane. In some embodiments, the wear indicator is a same color or a different color than that of the pipe wall contacting surface when the pipe wall contacting surface is between S1 and S3. Where the same color is used, the geometry of the wear indicator may be different than that of the pipe wall contacting surface to indicate wear.

Examples of a pigging device of this disclosure include a pigging device comprising a pipe wall contacting surface having a first size "S1" at time "t1", a second smaller size "S2" at time "t2", and a predetermined minimum effective size "S3," wherein t2>t1 and S1>S2≥S3; and a pipe wall contacting surface wear indicator, the wear indicator configured to visually indicate an amount of material loss of the pipe wall contacting surface between S1 and S3. The pipe wall contacting surface wear indicator may be located on the pipe wall contacting surface or not located on the pipe wall contacting surface. The pipe wall contacting surface wear indicator may be located at a predetermined depth "D" relative to the pipe wall contacting surface. The pipe wall contacting surface wear indicator may located a predetermined distance D away from the size S1 or from an edge of the pipe wall contacting surface. The pipe wall contacting wear indicator may include a first raised surface and may include a second raised surface located adjacent the first raised surface. The second raised surface may have a same height as that of the first raised surface or a different height. The pipe wall contacting surface wear indicator may include an insert having a first area at a first end and a second different area at a second end. The first end may be located nearer the pipe wall contacting surface than the second end. The pipe wall contacting surface wear indicator may include a first cavity having an open end and a closed end. The open end may be located nearer the pipe wall contacting surface than the closed end. The closed end may be located nearer the pipe wall contacting surface than the open end. The pipe wall contacting wear indicator may include a second cavity having an open end and a closed end, the second cavity being spaced apart from the first cavity. The spacing between the first and second cavities may be a predetermined spacing or a random spacing. The first and second cavities may be a same or a different size.

The pipe wall contacting surface wear indicator may include a same color as that of the pigging device or a different color than that of the pigging device. The pipe wall contacting surface wear indicator may include a same material as that of the pigging device or a different material than that of the pigging device. The pigging device may include a urethane material. The pigging device may be cylindrical-shaped, sphere-shaped, bullet-shaped, bowl-shaped, disc-shaped, cup-shaped, or any shape suitable to provide a portion that includes a pipe wall contacting surface.

Embodiments of pigging device of this disclosure are well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

The invention claimed is:

1. A pigging device comprising:
 a pipe wall contacting surface having a first size "S1" at time "t1", a second smaller size "S2" at time "t2", and a predetermined minimum effective size "S3," wherein t2>t1 and S1>S2≥S3;
 a pipe wall contacting surface wear indicator, the wear indicator configured to visually indicate an amount of material loss of the pipe wall contacting surface between S1 and S3;
 the pipe wall contacting wear indicator including a first raised surface and a second raised surface located adjacent the first raised surface.

2. The pigging device of claim 1, further comprising, the pipe wall contacting surface wear indicator being located on the pipe wall contacting surface.

3. The pigging device of claim 1, further comprising, the pipe wall contacting surface wear indicator being located at a predetermined depth "D" relative to the pipe wall contacting surface.

4. The pigging device of claim 1, further comprising, the pipe wall contacting surface wear indicator being located a predetermined distance D from the size S1.

5. The pigging device of claim 1, the second raised surface having a same height as that of the first raised surface.

6. The pigging device of claim 1, the second raised surface having a different height than that of the first raised surface.

7. A pigging device comprising:
 a pipe wall contacting surface having a first size "S1" at time "t1", a second smaller size "S2" at time "t2", and a predetermined minimum effective size "S3," wherein t2>t1 and S1>S2≥S3,
 a pipe wall contacting surface wear indicator, the wear indicator configured to visually indicate an amount of material loss of the pipe wall contacting surface between S1 and S3;
 the pipe wall contacting surface wear indicator including an insert having a first end with a first area and a second end with a second area larger than the first area, the first end being located nearer the pipe wall contacting surface than the second end.

8. A pigging device comprising:
 a pipe wall contacting surface having a first size "S1" at time "t1", a second smaller size "S2" at time "t2", and a predetermined minimum effective size "S3," wherein t2>t1 and S1>S2≥S3;
 a pipe wall contacting surface wear indicator, the wear indicator configured to visually indicate an amount of material loss of the pipe wall contacting surface between S1 and S3;
 the pipe wall contacting surface wear indicator including a first cavity having an open end and a closed end.

9. The pigging device of claim 8, the open end located nearer the pipe wall contacting surface than the closed end.

10. The pigging device of claim 8, the closed end located nearer the pipe wall contacting surface than the open end.

11. The pigging device of claim 8, further comprising, the pipe wall contacting wear indicator including a second cavity having an open end and a closed end, the second cavity being spaced apart from the first cavity.

12. The pigging device of claim 11, wherein a spacing between the first and second cavities is a predetermined spacing.

13. The pigging device of claim 11, wherein a spacing between the first and second cavities is a random spacing.

14. The pigging device of claim 11, the first and second cavities being a same size.

15. The pigging device of claim 11, the first and second cavities being a different size.

16. A method of indicating wear of a pipe wall contacting surface of a pigging device, the method comprising:
 inserting the pigging device into one end of a pipeline, the pigging device including:
  a pipe wall contacting surface having a first size "S1" at time "t1", a second smaller size "S2" at time "t2", and a predetermined minimum effective size "S3," wherein t2>t1 and S1>S2≥S3; and a pipe wall contacting surface wear indicator, the wear indicator configured to visually indicate an amount of material loss of the pipe wall contacting surface between S1 and S3;
retrieving the pigging device at another end of the pipeline; and
visually inspecting the wear indicator to determine the amount of the material loss of the pipe wall contacting surface between S1 and S3;
wherein, the wear indicator at least one of:
 a first raised surface and a second raised surface located adjacent the first raised surface;
 an insert having a first end with a first area and a second end with a second area larger than the first area, the first end being located nearer the pipe wall contacting surface than the second end; and
 a first cavity having an open end and a closed end.

* * * * *